June 5, 1934.  J. W. FRENCH  1,961,875
ANTIVIBRATION OBSERVATION STATION
Filed July 1, 1932  2 Sheets-Sheet 1

INVENTOR
James Weir French
BY
Ritter, Mechlin & O'Neill
ATTORNEYS

June 5, 1934.  J. W. FRENCH  1,961,875
ANTIVIBRATION OBSERVATION STATION
Filed July 1, 1932  2 Sheets-Sheet 2

INVENTOR
James Weir French
BY
Ritter, Mechlin & O'Neill
ATTORNEYS

Patented June 5, 1934

1,961,875

UNITED STATES PATENT OFFICE 1,961,875

ANTIVIBRATION OBSERVATION STATION

James Weir French, Anniesland, Glasgow, Scotland, assignor to Barr and Stroud, Limited, Glasgow, Scotland Application July 1, 1932, Serial No. 620,499
In Great Britain July 16, 1931

8 Claims. (Cl. 89—37)

This invention relates to observation stations for carrying an observation instrument or instruments and an operator or operators and which are supported on structures which are subject to vibration or shock, hereinafter referred to generally as vibration, which, if transmitted to the station, would affect the accuracy or convenience of observation. The invention has for its object to prevent or to reduce the transmission of such objectionable vibration to the stations. The invention is applicable to an observation station such as an observation tower on a structure such as a warship from which measurements of gunnery data may be made as, for example, the bearing and training, or the range and the course and speed of an enemy or other target. It is with reference to this particular application that the invention will be described.

According to this invention the observation station is carried upon the structure by a support comprising vibration absorbing means having an upper supporting surface bearing the station and normally lying in or approximately in the horizontal plane containing the centre of gravity of the station, and having also lateral bearing surfaces.

In accordance with this invention the support afforded to the observation station is such that transverse and vertical vibrational movements of the supporting structure, say the warship, are not communicated to the station. The station may, in some cases, be rotatable, say, in azimuth. Means may be provided for the correction of data (obtained by observation relative to the station, such as elevation and training) in respect of angular movement between the station and the supporting structure due to yielding of the vibration absorbing means, so as to give data with reference to the supporting structure.

The vibration absorbing means may comprise elements disposed around the station, for example, in groups spaced apart around the station.

Suitable material for the vibration absorbing means would be self-damping elastic material as described in the specification of Patent No. 1,870,310, issued to Barr and Stroud, Limited and, in describing this invention, it will be assumed that the vibration absorbing means comprise elements of the types therein described and illustrated. The material used should be capable of absorbing vibrations over a wide range of periodicity.

Some examples according to this invention will now be described with reference to the accompanying drawings, in which:—

Figure 1:
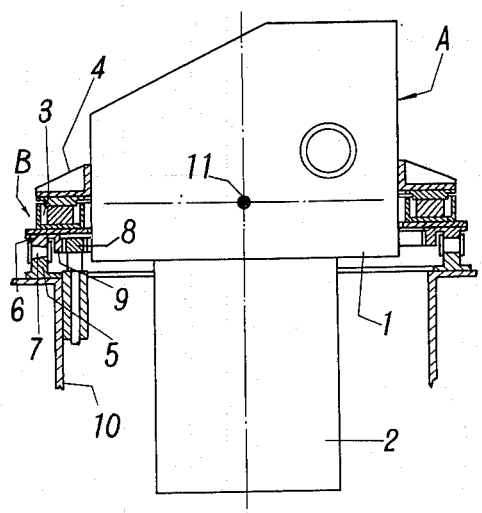
Figure 1 is an elevation partly in section showing an observation tower on a warship and its support according to a first example, the support being shown in diagram.

In the example indicated in Figure 1, the tower A comprises an upper portion 1 and a lower portion 2 and is carried by a support B comprising a casing 3 which extends circularly around the tower and contains anti-vibration elements, shown diagrammatically, the disposition of which is described later. The weight of the tower is distributed over the anti-vibration elements by means of brackets 4. The casing 3 is carried upon a roller path having races 5 and 6 and rollers 7. The training of the race 6 relatively to the tower A is effected by rotation of a pinion 8 which gears with an annular toothed wheel 9 integral with the race 6, the pinion 8 being mounted upon the ship's structure 10. The centre of gravity indicated on the drawings at 11 should lie as nearly as is practicable in the plane of the upper supporting surface of the anti-vibration elements contained within the casing 3, otherwise a small defect of balance vertically may result not only in angular surging motion but also in the building up of a vibratory movement transmitted from the structure 10 to the tower A through the anti-vibration elements. The lower portion of the tower, containing apparatus, and it may be operators, serves to balance the upper portion containing the observation apparatus and observers.

Figure 2:
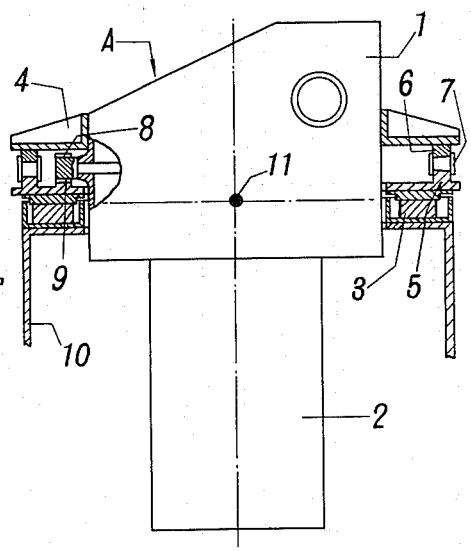
Figure 2 is an elevation partly in section showing an observation tower on a warship and its support according to a second example, the support being shown in diagram.

In the example indicated in Figure 2, the casing 3 rests directly upon the ship's structure 10 and supports the races 5 and 6 and the rollers 7 of the roller path. The training movement of the tower may be effected in any convenient manner. For example, the pinion 8 which gears with the circular rack 9 on the race 6, might be carried directly upon the tower from which it would be driven.

Figure 3:
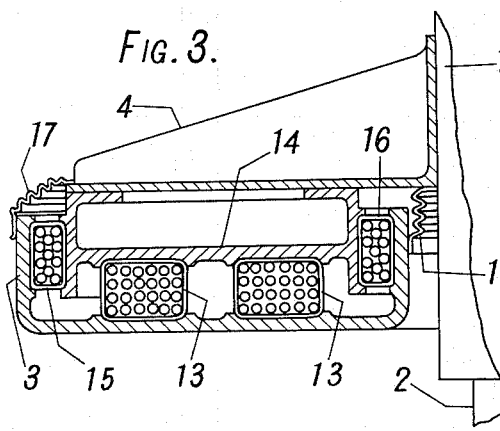
Figure 3 is a sectional elevation showing one example of vibration absorbing elements.

A transverse section through the casing 3 is represented in Figure 3, which shows one arrangement of the anti-vibration elements within the casing. The vibration absorbing material provided is in the form of columns 13 which lie within the casing 3 and which support a member 14 of ring form over which the total weight of the tower A is distributed by means of the brackets 4. Any vibratory movement communicated to the casing 3, whether in the vertical or transverse directions, is absorbed by the material of the columns 13 and is not communicated to the member 14 associated with the tower.

The columns 13 may be spaced or grouped around the circumference within the casing. The number of columns will depend upon the nature of the material and the load per square inch that can be usefully applied to it.

To resist lateral surging motion, due it may be to gun shock, additional elements 15 and 16 of vibration absorbing material are arranged around the inner and outer periphery within the casing and between the vibrating and non-vibrating members and provide lateral bearing surfaces. Moisture may be prevented from entering the casing by suitable flexible shields such as 17 and 18.

Figure 4:
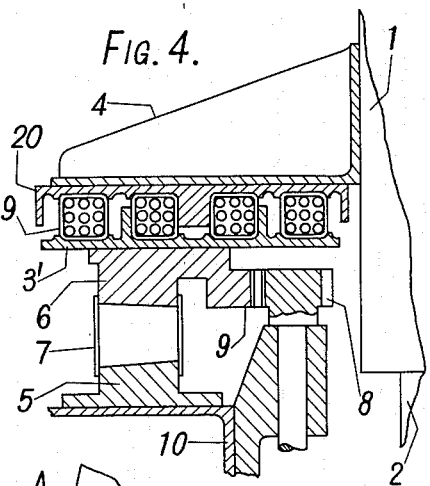
Figure 4 is a sectional elevation.
Figure 5:
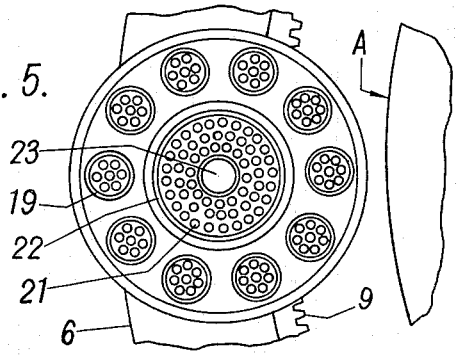
Figure 5 is a corresponding sectional plan, showing a second example of vibration absorbing elements.

It is not essential that one casing 3 extending circularly around the tower should be used, the vibration absorbing material may be located within a number of separate casings 3¹. For example, there may be provided four circular casings 3¹ spaced 90 degrees apart around the tower. One of these casings is represented in Figures 4 and 5, in which the roller path and driving gear correspond with those represented in Figure 1. The bottom of the circular casing 3¹ rests upon the race 6. Columns 19 of vibration absorbing material are enclosed within the casing. A top plate 20 attached to the tower rests upon the upper surface of the columns 19 and carries the weight of the tower A through the intermediary of the bracket 4. For resisting lateral surging motion of the tower there is provided a ring of vibration absorbing material 21 which is enclosed within a wall 22 associated with the bottom of the casing 3¹ and which surrounds a pin 23 associated with the top plate 20.

An observation tower of the type chosen to illustrate the application of this invention should be capable of measuring angles in the vertical planes of the line of sight and in the horizontal plane of training with an accuracy of about one minute. These angles must be determined with reference to the structure of the ship. In the arrangements described, however, they are measured with reference to the tower. It is necessary, therefore, to correct the measured values of the angles in order to obtain the desired values relatively to the ship.

A tower supported as described may move laterally in the plane of the deck of the ship and in a direction normal to this plane. It may also oscillate angularly about the normal. All these motions will generally be of small and negligible amount. The tower, however, as the result of initial defective levelling or as a result of some change in the position of the centre of gravity in a transverse direction, may become inclined with reference to the supporting structure by an amount that may be of importance. For the correction of the effects of this angular tilt it may be necessary to introduce correction devices.

A transverse horizontal displacement in a deviation towards the target need not be regarded, as the range would only be affected by an entirely negligible amount.

A vertical or transverse displacement would cause an angular error in angle of elevation or bearing of an entirely negligible amount, as a displacement of about twelve inches would be necessary to introduce an error of one minute when the range of the target is 1,000 yards.

An oscillatory movement about the vertical axis might result from sudden changes of the speed of training.

Figure 8:
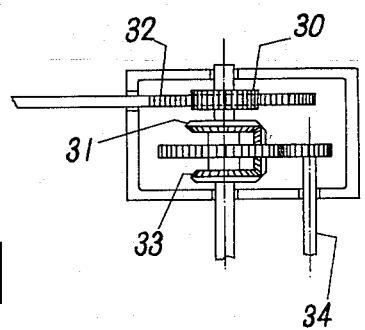
Figure 8 shows differential mechanism for the application of correction.

To provide a correction gear for such momentary oscillatory movements will generally be unnecessary, but the correction gear involved would be of a simple type comprising a differential such as is represented in Figure 8. To one element of the differential there would be applied the actual training movement imparted by rotation of the pinion 8; to the other element there would be applied the angular horizontal displacement of the tower relatively to the supporting structure. The outgoing element of the differential would indicate at any moment the true bearing of the target relatively to the structure.

Figure 6:
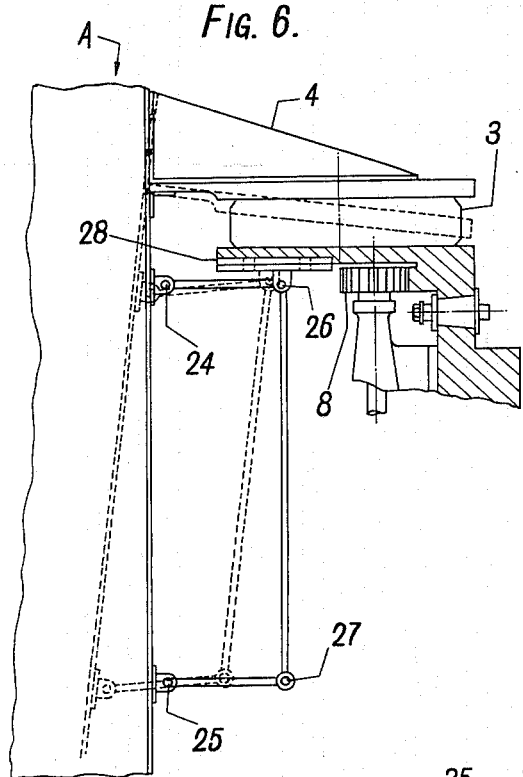
Figure 6 shows mechanism for the measurement of the angle of tilt of a station relatively to its supporting structure.

A tilt of the axis of the tower in the plane of the line of sight might be of importance when observing upon a target at either high or low elevations. A suitable type of correction gear for this particular error would comprise elements such as are represented, for example, in Figures 6, 7 and 8, for the measurement in the plane of sight of the angular displacement of the tower relatively to the supporting structure and for the addition of the displacement by means of, say, a differential gear. For the measurement of the tilt, a suitable mechanism would be that represented in Figures 6 and 7, it being assumed that the line of sight rotates with the tower and not independently. In Figure 6 the tower A is supported as in Figure 1, the casing 3 being carried upon a roller path provided with a training pinion 8, and universal joints 24 and 25 are provided and carried upon the wall of the tower. The joint 26 is carried upon a radial slide 28 mounted upon the upper race of the roller path which, apart from small relative movements, rotates with the tower. The four joints 24, 25, 26 and 27 lie at the corners of a parallelogram. An inclination of the tower A results in a corresponding inclination of the link 26—27. A transverse displacement of the tower A in the plane of the diagram, Figure 6, is not restricted as the joint 26 is carried upon the slider 28 which is free to move radially relatively to the structure. The inclination of the link 26—27 relatively to this slider therefore affords a direct measure of the inclination of the tower in the plane of the line of sight. Two such mechanisms may be provided as indicated in the plan, Figure 7, the links of one mechanism 29 being set in the plane of the line of sight and those of the other 48 in the cross plane at right angles. The displacement of the joint 27 as the result of tilt relatively to the slider joint 26 of Figure 6 may be applied as in Figure 8 to one element 31 of a differential through the intermediary of, say a rack 32 and pinion 30 associated with the element 31. The actual training movement imparted to the roller path through the intermediary of the pinion 8, Figure 6, may be communicated to the element 33 of the differential, Figure 8. The outgoing shaft 34 will then indicate the algebraic sum of the movements applied to the elements of the differential and will thus indicate the correct bearing angle of the target being observed upon by the sighting device carried by the tower.

Figure 7:
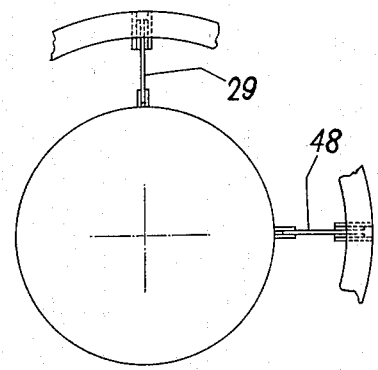
Figure 7 is a plan showing mechanism for the measurement of tilt angles in the plane of the line of sight and in a plane normal to it.
Figure 9:
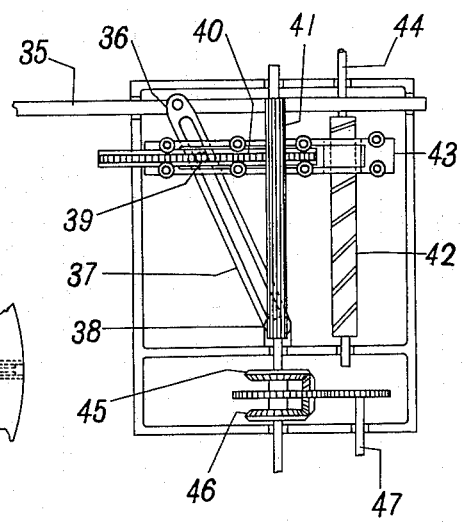
Figure 9 shows multiplying and differential mechanism for the determination and application of corrections.

A tilt of the axis of the tower in the plane normal to that containing the line of sight will not produce a training error of the line of sight of importance when the object observed upon is at a low elevation, but an important error will be introduced at higher elevations. A suitable type of correction gear for this particular error would comprise the link mechanism for the measurement of the angle of tilt as represented in Figures 6 and 7 in conjunction with a mechanism such as that represented in Figure 9. A displacement in proportion to the tilt as measured by the link system, Figure 6, occupying the position 48 of Figure 7, normal to the plane containing the line of sight, is applied, see Figure 9, through the rod 35 to the end 36 of a link 37 pivoted at its other end 38. The link 37 is thereby inclined by an amount corresponding with the tilt. A pin 39 engages the slot of the link 37 and is mounted upon a slider 40. As the member 35 is displaced longitudinally, the pin 39 moves proportionally in the same direction. A rack on the slider 40 engages a pinion rod 41 which is rotated by an amount corresponding with the transverse displacement of the pin 39. The distance of the slider 40 from the pivot 38 can be varied by suitable rotation of a screw of variable pitch 42 which engages the carrier 43 of the slide 40. The elements described constitute a multiplier of a known type. Any other equivalent device may be employed. The screw 42 has a thread cut in accordance with the tangent of the angle of sight measured by the observation tower and the angle of sight is accordingly applied to the driving end 44 of this variable pitch screw.

The amount of bearing correction equals the tilt measured in a plane normal to the plane of sight as measured by the link mechanism 48 of Figure 7, multiplied by the tangent of the angle of sight. This correction which corresponds with the rotation of the pinion rod 38 is applied to one element 45 of a differential. The bearing of the observation tower as applied by the pinion 8 of Figure 6 is communicated to the element 46 of the differential. These two values are summed by the differential and communicated to the outgoing shaft 47 which therefore indicates the corrected bearing, that is, the bearing of the target relatively to the structure resulting from the measurement of the bearing by the sighting apparatus in the tower.

I claim:—

1. An observation station and a support therefor on a structure subject to vibration, the support comprising vibration absorbing means having an upper supporting surface bearing the station and normally lying substantially in the horizontal plane containing the centre of gravity of the station, and, in combination therewith, means for the correction of data obtained by observation relative to the station in respect of angular movement of the station due to yielding of the vibration absorbing means, to give data with reference to the supporting structure.

2. An observation station and a support therefor on a structure subject to vibration, the support comprising parts which are relatively movable angularly for rotation of the station in azimuth, and vibration absorbing means having an upper supporting surface bearing the station and normally lying substantially in the horizontal plane containing the centre of gravity of the station, and, in combination therewith, means for the correction of data obtained by observation relative to the station in respect of angular movement of the station due to yielding of the vibration absorbing means, to give data with reference to the supporting structure.

3. An observation station and a support therefor on a structure subject to vibration, the support comprising parts which are relatively movable angularly for rotation of the station in azimuth, and vibration absorbing means arranged around the station and having an upper supporting surface bearing the station and normally lying substantially in the horizontal plane containing the centre of gravity of the station, and, in combination therewith, means for the correction of data obtained by observation relative to the station in respect of angular movement of the station due to yielding of the vibration absorbing means, to give data with reference to the supporting structure.

4. An observation station and a support therefor on a structure subject to vibration, the support comprising parts which are relatively movable angularly for rotation of the station in azimuth, and vibration absorbing means having an upper supporting surface bearing the station and normally lying substantially in the horizontal plane containing the centre of gravity of the station, and, in combination therewith, means for the correction of data observed with reference to the station in respect of tilt of the station relative to the supporting structure, to give data with reference to said supporting structure.

5. An observation station and a support therefor on a structure subject to vibration, the support comprising parts which are relatively movable angularly for rotation of the station in azimuth, and vibration absorbing means having an upper supporting surface bearing the station and normally lying substantially in the horizontal plane containing the centre of gravity of the station, and, in combination therewith, means for the correction of data observed with reference to the station in respect of angular movement of the station about a vertical axis due to yielding of the vibration absorbing means, to give data with reference to the supporting structure.

6. An observation station and a support therefor on a structure subject to vibration, the support comprising parts which are relatively movable angularly for rotation of the station in azimuth, and vibration absorbing means having an upper supporting surface bearing the station and normally lying substantially in the horizontal plane containing the centre of gravity of the station, and, in combination therewith, means including differential mechanism for the correction of data obtained by observation relative to the station in respect of angular movement of the station due to yielding of the vibration absorbing means, to give data with reference to the supporting structure.

7. An observation station and a support therefor on a structure subject to vibration, the support comprising parts which are relatively movable angularly for rotation of the station in azimuth, and vibration absorbing means having an upper supporting surface bearing the station and normally lying substantially in the horizontal plane containing the centre of gravity of the station, and, in combination therewith, means including differential mechanism for the correction of data observed with reference to the station in respect of tilt of the station relative to the supporting structure, to give data with reference to said supporting structure.

8. An observation station and a support therefor on a structure subject to vibration, the support comprising parts which are relatively movable angularly for rotation of the station in azimuth, vibration absorbing means having an upper supporting surface bearing the station and normally lying substantially in the horizontal plane containing the centre of gravity of the station, and, in combination therewith, means including differential mechanism for the correction of data observed with reference to the station in respect of angular movement of the station about a vertical axis due to yielding of the vibration absorbing means, to give data with reference to the supporting structure.

JAMES WEIR FRENCH.